(12) United States Patent
Allen

(10) Patent No.: US 12,313,445 B2
(45) Date of Patent: May 27, 2025

(54) SYSTEM AND METHOD FOR MEASURING A FORCE ON A JACK ASSEMBLY

(71) Applicant: The Boeing Company, Chicago, IL (US)

(72) Inventor: Nathan A. Allen, San Antonio, TX (US)

(73) Assignee: THE BOEING COMPANY, Arlington, VA (US)

( * ) Notice: Subject to any disclaimer, the term of this patent is extended or adjusted under 35 U.S.C. 154(b) by 550 days.

(21) Appl. No.: 17/859,434

(22) Filed: Jul. 7, 2022

(65) Prior Publication Data

US 2024/0011820 A1  Jan. 11, 2024

(51) Int. Cl.
*G01G 21/28* (2006.01)
*G01G 7/00* (2006.01)
*G01G 19/02* (2006.01)

(52) U.S. Cl.
CPC .............. *G01G 21/283* (2013.01); *G01G 7/00* (2013.01); *G01G 19/02* (2013.01)

(58) Field of Classification Search
USPC .......................................................... 177/1
See application file for complete search history.

(56) References Cited

U.S. PATENT DOCUMENTS

| | | | | | |
|---|---|---|---|---|---|
| 4,479,634 | A | * | 10/1984 | Blatz | B66F 7/10 254/133 R |
| 6,257,552 | B1 | * | 7/2001 | Crow | B66F 5/04 254/2 B |
| 6,581,908 | B1 | * | 6/2003 | Francis | B25H 1/0007 254/2 B |
| 9,174,828 | B2 | * | 11/2015 | Stokes | B66F 3/28 |
| 11,479,450 | B2 | * | 10/2022 | Desormeau | B66F 3/28 |

FOREIGN PATENT DOCUMENTS

| | | | | | |
|---|---|---|---|---|---|
| AU | 2018263988 | A1 | * | 5/2019 | |
| CA | 2803209 | C | * | 11/2015 | B64F 5/60 |
| JP | 57029914 | | * | 2/1982 | G01N 3/00 |

* cited by examiner

*Primary Examiner* — Jacques M Saint Surin
(74) *Attorney, Agent, or Firm* — MH2 Technology Law Group LLP

(57) ABSTRACT

A jack assembly includes a body. The jack assembly also includes a lifting piston positioned at least partially above the body and configured to move up and down with respect to the body. The jack assembly also includes a lock collar positioned at least partially around the lifting piston. The lock collar is configured to move up and down with respect to the lifting piston in response to rotating the lock collar with respect to the lifting piston. The jack assembly also includes a load cell positioned at least partially around the lifting piston and between the body and the lock collar. The jack assembly is configured to support an object, which exerts a downward force onto the lifting piston. The downward force is transferred from the lifting piston to the lock collar to the load cell to the body. The load cell measures the downward force.

18 Claims, 7 Drawing Sheets

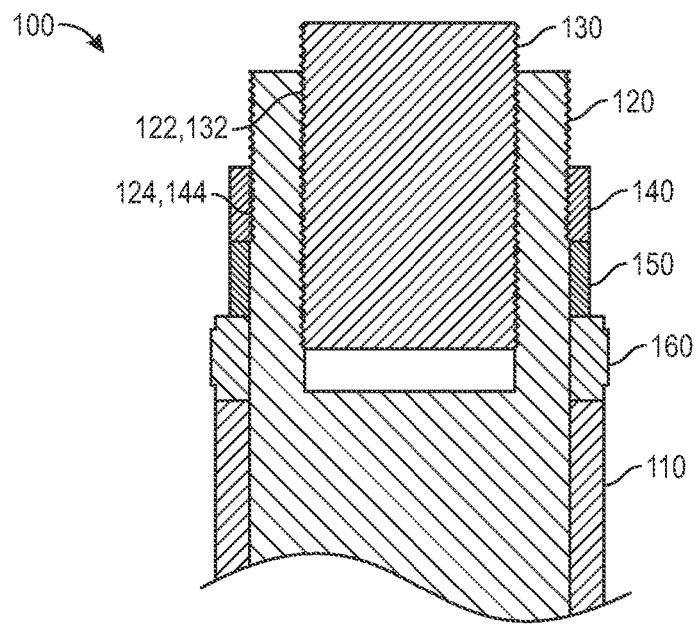
FIG. 2
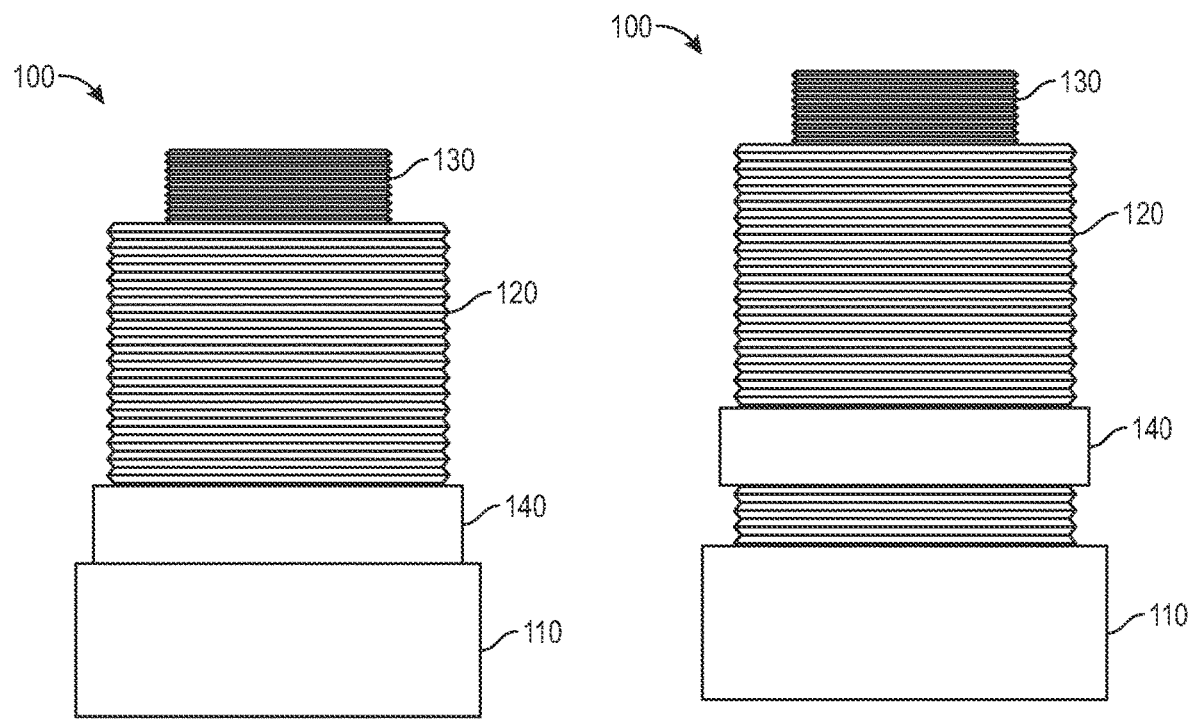
FIG. 3
FIG. 4

SYSTEM AND METHOD FOR MEASURING A FORCE ON A JACK ASSEMBLY

GOVERNMENT FUNDING

This invention was made with Government support under FA8625-16-C-6599 awarded by Department of Defense. The government has certain rights in this invention.

BACKGROUND

A jack is a mechanical lifting device used to apply a force to lift a load (e.g., an aircraft). A mechanical jack employs a screw thread for lifting the load. A hydraulic jack uses hydraulic power to lift the load. A load cell is a force transducer that converts a force such as tension, compression (e.g., weight), pressure, and/or torque into an electrical signal that can be measured and standardized. As the force applied to the load cell increases, the electrical signal changes proportionally. The most common types of load cells are strain gauges, pneumatic, and hydraulic. Currently, when using a load cell with a jack (e.g., to measure a load or weight), the load cell is inserted between the jack and the load, such as an aircraft. However, load cells that are installed using current techniques cannot be removed without first completely unloading the jack. Therefore, what is needed is an improved load cell for use with an aircraft jack.

SUMMARY

A jack assembly is disclosed. The jack assembly includes a body. The jack assembly also includes a lifting piston positioned at least partially above the body and configured to move up and down with respect to the body. The jack assembly also includes a lock collar positioned at least partially around the lifting piston. The lock collar is configured to move up and down with respect to the lifting piston in response to rotating the lock collar with respect to the lifting piston. The jack assembly also includes a load cell positioned at least partially around the lifting piston and between the body and the lock collar. The jack assembly is configured to support an object, which exerts a downward force onto the lifting piston. The downward force is transferred from the lifting piston to the lock collar to the load cell to the body. The load cell measures the downward force.

In another example, a jack assembly configured to support an object is disclosed. The jack assembly includes a body. The body includes a central cylinder defining a vertical bore therein, and a plurality of legs that are circumferentially offset around the central cylinder. The jack assembly also includes a lifting piston positioned at least partially in the vertical bore of the central cylinder. The lifting piston defines a vertical bore therein. The lifting piston is configured to hydraulically move up and down with respect to the body. The jack assembly also includes an extension screw positioned at least partially in the vertical bore of the lifting piston. The extension screw comprises outer threads that are engaged with inner threads of the lifting piston. The extension screw is configured to mechanically move up and down with respect to the lifting piston in response to rotating the extension screw with respect to the lifting piston. The jack assembly also includes a lock collar positioned at least partially around the lifting piston. The lock collar comprises inner threads that are engaged with outer threads of the lifting piston. The lock collar is configured to mechanically move up and down with respect to the lifting piston in response to rotating the lock collar with respect to the lifting piston. The jack assembly also includes a load distribution plate positioned at least partially around the lifting piston and between the body and the lock collar. The load distribution plate includes a single annular plate or two or more plate portions that are configured to be coupled together. The jack assembly also includes a load cell positioned at least partially around the lifting piston and between the body and the load distribution plate. The load cell includes a single annular cell, a single substantially U-shaped cell, or two or more cell portions that are configured to be coupled or hinged together. In response to the object exerting a downward force onto the lifting piston, the extension screw, or both, the downward force is transferred from the lifting piston to the lock collar to the load distribution plate to the load cell to the body. The load cell measures the downward force.

A method for measuring a downward force exerted by an object on a jack assembly is also disclosed. The method includes positioning a lock collar at least partially around a lifting piston. The method also includes raising the lifting piston and the lock collar such that a first gap is formed between the lock collar and a body. The method also includes positioning a load cell at least partially around the lifting piston. The load cell is positioned in the first gap between the lock collar and the body.

DRAWINGS

The above and/or other aspects and advantages will become more apparent and more readily appreciated from the following detailed description of examples, taken in conjunction with the accompanying drawings, in which:

FIG. 2 illustrates a cross-sectional side view of the jack assembly, according to an example.

FIG. 3 illustrates a side view of the jack assembly with a lock collar contacting a body, according to an example.

FIG. 4 illustrates a side view of the jack assembly with a lifting piston and the lock collar raised (e.g., to a first height) such that the lock collar is spaced apart from the body, according to an example.

DETAILED DESCRIPTION

Figure 1A:
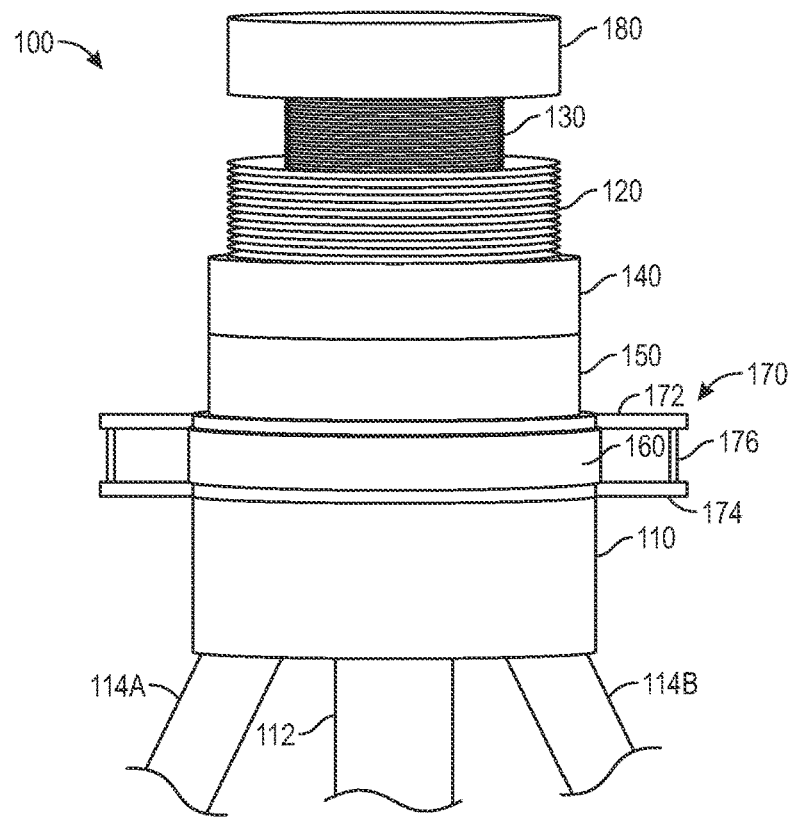
FIG. 1A illustrates a front perspective view of a jack assembly, according to an example.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

It will be understood that when an element is referred to as being "on," "associated with," "connected to," "electrically connected to," or "coupled to" to another component, it may be directly on, associated with, connected to, electrically connected to, or coupled to the other component or intervening components may be present. In contrast, when a component is referred to as being "directly on," "directly associated with," "directly connected to," "directly electrically connected to," or "directly coupled to" another component, there are no intervening components present. As used herein, the term "and/or" includes any and all combinations of one or more of the associated listed items.

It will be understood that although the terms first, second, etc., may be used herein to describe various elements, components, and/or directions, these elements, components, and/or directions should not be limited by these terms. These terms are only used to distinguish one element, component, and/or direction from another element, component, and/or direction. For example, a first element, component, or direction could be termed a second element, component, or direction without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

As described below, a load cell can be inserted between the top of a jack extension screw and an object (e.g., an aircraft). This places a unsecured connection in the load path, which can cause a failure mode in the presence of side loading. For example, the jack and/or the load cell can be unstable when attempting to support the aircraft on a sloped surface or in windy conditions. Thus, in a situation where a plurality of jacks are used to support at least a portion of the aircraft, and each jack includes a load cell, if one of the load cells is inaccurate or otherwise not functioning properly, all of the jacks must be lowered and unloaded to remove and analyze the one malfunctioning load cell. This is a time-consuming and labor-intensive process.

Figure 1B:
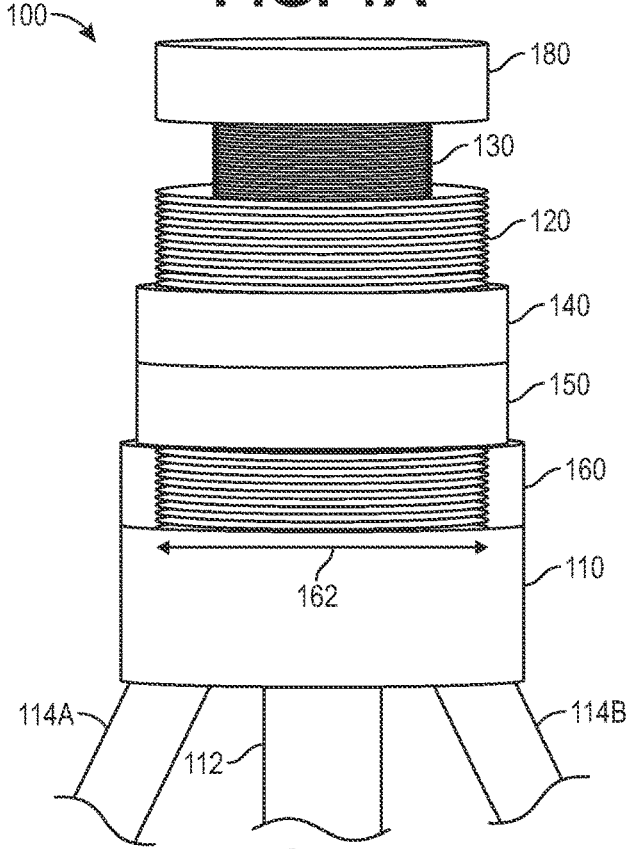
FIG. 1B illustrates a side perspective view of the jack assembly, according to an example.

FIGS. 1A and 1B illustrate front and side perspective views of a jack assembly 100, according to an example. FIG. 1B is rotated (e.g., 90 degrees) with respect to FIG. 1A. The jack assembly 100 can be configured to extend and retract vertically and to support the weight of an object 180. The jack assembly 100 can also be configured to measure the weight of the object 180 while the object 180 is being supported.

The jack assembly 100 can include a body 110. The body 110 can include a (e.g., central) cylinder 112, which can define a vertical bore formed at least partially therethrough. The body 110 can also include one or more legs (two are shown: 114A, 114B). Although two legs are shown, the jack assembly 100 can also include more or fewer legs. The legs 114A, 114B can be spaced circumferentially around the central cylinder 112.

The jack assembly 100 can also include a lifting piston 120. The lifting piston 120 can be positioned at least partially within the vertical bore of the central cylinder 112 of the body 110. The lifting piston 120 can be configured to actuate vertically with respect to the body 110 (e.g., hydraulically and/or mechanically). More particularly, the lifting piston 120 can extend upward at least partially out of the body 110 and retract downward at least partially into the body 110.

The jack assembly 100 can also include an extension screw 130. The extension screw 130 can be positioned at least partially within a vertical bore in the lifting piston 120. The extension screw 130 can be configured to actuate vertically with respect to the lifting piston 120 (e.g., hydraulically and/or mechanically). For example, the extension screw 130 can include outer threads that engage with inner threads of the lifting piston 120, and the extension screw 130 can actuate vertically by rotating the extension screw 130 with respect to the lifting piston 120. The extension screw 130 can extend upward at least partially out of the lifting piston 120 and retract downward at least partially into the lifting piston 120. The top of the extension screw 130 can be configured to contact a lower surface of the object (e.g., an aircraft) 180 to support at least a portion of the weight of the object 180.

The jack assembly 100 can also include a lock collar 140. The lock collar 140 can be substantially annular and positioned at least partially around the lifting piston 120. The lock collar 140 can include inner threads that engage with outer threads of the lifting piston 120. The lock collar 140 is configured to move up and down with respect to the lifting piston 120 in response to rotating the lock collar 140 with respect to the lifting piston 120.

The jack assembly 100 can optionally also include a load distribution plate 150. The load distribution plate 150 can be positioned at least partially around the lifting piston 120. The load distribution plate 150 can be positioned at least partially between the body 110 and the lock collar 140. More particularly, the load distribution plate 150 can be positioned at least partially above the body 110 and at least partially below the lock collar 140. The load distribution plate 150 can be a single annular member or two or more plate portions that are configured to be coupled and/or hinged together. The load distribution plate 150 can move vertically together with the lock collar 140 or separate from the lock collar 140. In other words, the lock collar 140 and load distribution plate 150 can both be lifted and/or lowered together. Alternatively, the lock collar 140 can be lifted before the load distribution plate 150 and/or the load distribution plate 150 can be lowered before the lock collar 140.

The jack assembly 100 includes a load cell 160. The load cell 160 can be configured to measure the downward force (e.g., weight) exerted by the object 180, as described in greater detail below. The load cell 160 can be positioned at least partially around the lifting piston 120. The load cell 160 can be positioned at least partially between the body 110 and the load distribution plate 150, or positioned at least partially between the body 110 and the lock collar 140 (when the load distribution plate 150 is omitted). More particularly, the load cell 160 can be positioned at least partially above the body 110 and at least partially below the lock collar 140 and/or the load distribution plate 150. Placing the load cell 160 in this location improves the stability of the jack assembly 110 when compared to conventional jack assemblies with the load cell positioned above the extension screw (e.g., when attempting to support the object 180 on a sloped surface or in windy conditions). As described below, placing the load cell 160 in this location can also allow the load cell 160 to be added to and/or removed from the jack assembly 100 while the jack assembly 100 continues to support the object 180. In other words, unlike conventional jack assemblies that need to be unloaded to add and/or remove the load cell, the jack assembly 100 described herein does not need to be unloaded.

The outer surface of the load cell 160 can be substantially flat and/or substantially planar, which differs from conventional load cells. In the example shown, the load cell 160 can be substantially U-shaped (e.g., semi-circular, horseshoe-shape, crescent-shape, or the like) with a circumferential gap 162 that allows the load cell 160 to be moved laterally (e.g., as opposed to vertically) to position the load cell 160 at least partially around the lifting piston 120 and/or to remove the load cell 160 from the lifting piston 120. In another example, the load cell 160 can be or include a single annular member or two or more cell portions that are configured to be coupled and/or hinged together.

The load distribution plate 150 can be configured to support the portion of the lock collar 140 that is above the circumferential gap 162 in the load cell 160. As such, the load distribution plate 150 can be thicker than the lock collar 140 and/or made of a stronger material than the lock collar 140. For example, the lock collar 140 can be made of steel, and the load distribution plate 150 can be made of titanium. The load distribution plate 150 can be used when the load of the object 180 is greater than a predetermined threshold and omitted when the load of the object 180 is less than the predetermined threshold.

In at least one example, the jack assembly 100 can also include a housing 170. The housing 170 can be part of the load distribution plate 150, the load cell 160, or both. In another example, the housing 170 can be separate from both. The housing 170 can be positioned at least partially around (e.g., laterally, above, and/or below) the load cell 160. In one example, the housing 170 can be positioned at least partially around the lifting piston 120 and between the body 110 and the load distribution plate 150 (or the lock collar 140 when the load distribution plate 150 is omitted) before the load cell 160 is positioned at least partially around the lifting piston 120 and between the body 110 and the load distribution plate 150 (or the lock collar 140 when the load distribution plate 150 is omitted).

The housing 170 can include a first portion 172 that is positioned at least partially between the load cell 160 and the load distribution plate 150 (or the lock collar 140 when the load distribution plate 150 is omitted). The housing 170 can also include a second portion 174 that is positioned at least partially between the body 110 and the load cell 160. The portions 172, 174 can be or include plates. The housing 170 can also include a removable or integrated supporting and lifting device 176 that is positioned at least partially between the portions 172, 174. The housing 170 can be configured to support and/or lift the lifting piston 120, the extension screw 130, the lock collar 140, the load distribution plate 150, the object 180, or a combination thereof (e.g., without using the hydraulic pressure supplied to the lifting piston 120). More particularly, the supporting and lifting device 176 can be configured to (e.g., hydraulically) lift the portion 172, which can lift the lifting piston 120, the extension screw 130, the lock collar 140, the load distribution plate 150, the object 180, or a combination thereof. This can create a vertical gap into which the load cell 160 can then be introduced. Alternatively, the load cell 160 can be (e.g., laterally) withdrawn from the vertical gap (e.g., after the load has been measured). In other words, the lifting device 176 can be configured to lift the first plate 172 with respect to the second plate 174, which lifts the load distribution plate 150 and thereby creates a vertical gap between the body 110 and the load distribution plate 150. The load cell 160 is configured to be introduced into the vertical gap, removed from the vertical gap, or both.

The object 180 can be or include at least a portion of a vehicle. For example, the object 180 can be or include an aircraft (e.g., an airplane, a helicopter, an unmanned aerial vehicle, etc.). However, other objects are also contemplated herein. The object 180 exerts a downward force onto the lifting piston 120 and/or the extension screw 130. The downward force is transferred from the lifting piston 120 to the lock collar 140 to the load cell 160 to the body 110, and the load cell 160 measures the downward force.

FIG. 2 illustrates a cross-sectional side view of the jack assembly 100, according to an example. As mentioned above, the extension screw 130 can be positioned at least partially within the bore in the lifting piston 120. The extension screw 130 can be configured to actuate vertically with respect to the lifting piston 120 (e.g., hydraulically and/or mechanically), which can result in the vertical gap shown below the extension screw 130 in FIG. 2. For example, the extension screw 130 can include outer threads 132 that engage with inner threads 122 of the lifting piston 120, and the extension screw 130 can actuate vertically by rotating the extension screw 130 with respect to the lifting piston 120. The extension screw 130 can extend upward at least partially out of the lifting piston 120 and retract downward at least partially into the lifting piston 120.

Similarly, the lock collar 140 can include inner threads 144 that engage with outer threads 124 of the lifting piston 120, and the lock collar 140 can move vertically with respect to the lifting piston 120 by rotating the lock collar 140 with respect to the lifting piston 120.

The load distribution plate 150 may not include inner threads that are configured to engage the outer threads 124 of the lifting piston 120. Similarly, the load cell 160 may not include inner threads that are configured to engage the outer threads 124 of the lifting piston 120. As a result, the load distribution plate 150 and/or the load cell 160 can be configured to move vertically with respect to the lifting piston 120 without rotating the load distribution plate 150 and/or the load cell 160.

FIG. 3 illustrates a side view of the jack assembly 100 with the lock collar 140 contacting the body 110, according to an example. When the lower surface of the lock collar 140 is in contact with the upper surface of the body 110, the threaded engagement between the lifting piston 120 and the lock collar 140 allows the body 110 and/or the lock collar 140 to support the weight of the lifting piston 120, the extension screw 130, the object 180 or a combination thereof. In other words, the lifting piston 120, the extension screw 130, and/or the object 180 are prevented from moving downward.

FIG. 4 illustrates a side view of the jack assembly 100 with the lifting piston 120 and the lock collar 140 raised such that the lock collar 140 is spaced apart from the body 110, according to an example. The lifting piston 120 can be (e.g., hydraulically) lifted. The threaded engagement between the lifting piston 120 and the extension screw 130 causes the extension screw 130 to move upward together with the lifting piston 120. Similarly, the threaded engagement between the lifting piston 120 and the lock collar 140 causes the lock collar 140 to move upward together with the lifting piston 120. Once in this raised position as shown in FIG. 4, the lock collar 140 can then be rotated with respect to the lifting piston 120 to move the lock collar 140 downward into contact with the body 110. As mentioned above with respect to FIG. 3, once the lock collar 140 is in contact with the body 110, the lifting piston 120, the extension screw 130, and/or the object 180 are supported (e.g., prevented from moving downward) even if the hydraulic force applied to/by the lifting piston 120 ceases.

Figure 5:
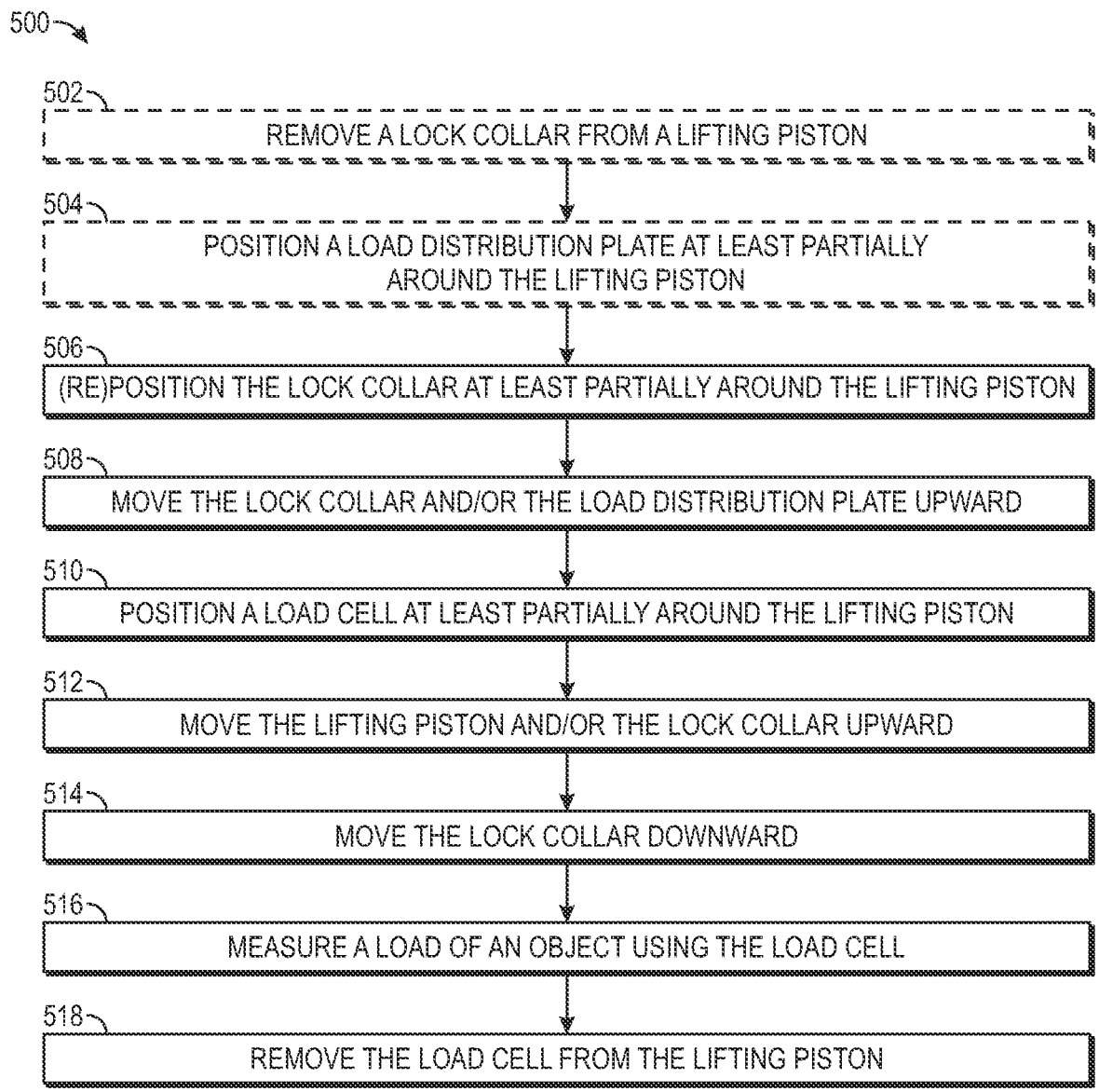
FIG. 5 illustrates a flowchart of a method for measuring a load of an object with the jack assembly, according to an example.

FIG. 5 illustrates a flowchart of a method 500 for measuring a load (e.g., weight) of the object 180 with the jack assembly 100, according to an example. An illustrative order of the method 500 is provided below; however, one or more steps of the method 500 can be performed in a different order, combined, split into sub-steps, repeated, or omitted.

The method 500 can optionally include removing the lock collar 140 from the lifting piston 120, as at 502. This can include rotating the lock collar 140 to move the lock collar 140 upward with respect to the body 110 and/or the lifting piston 120 until the lock collar 140 can be removed from the top of the lifting piston 120.

Figure 6:
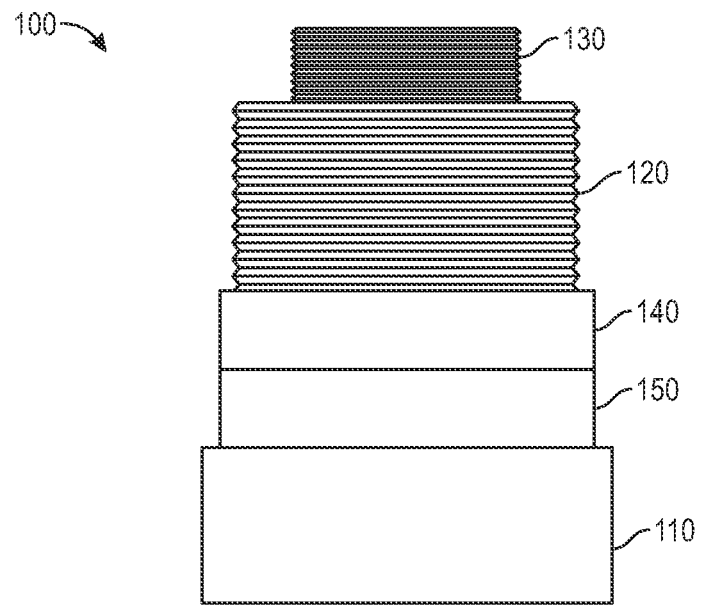
FIG. 6 illustrates a side view of the jack assembly with a load distribution plate positioned between the lock collar and the body, according to an example.

The method 500 can also optionally include positioning the load distribution plate 150 at least partially around the lifting piston 120, as at 504. This is shown in FIG. 6. In one example, the load distribution plate 150 can be a single annular plate that can be positioned proximate to the top of the lifting piston 120 and then moved downward with respect to the lifting piston 120. In another example, the load distribution plate 150 can include two or more circumferentially offset portions that can be configured to be coupled together or hinged together, and the two or more portions can be moved laterally toward the lifting piston 120 and then closed around the lifting piston 120. In yet another example, the load distribution plate 150 may be omitted.

The method 500 can also include positioning the lock collar 140 at least partially around the lifting piston 120, as at 506. This is also shown in FIG. 6. In one example, the lock collar 140 can be a single annular plate that can be positioned proximate to the top of the lifting piston 120 and then moved downward with respect to the lifting piston 120. In another example, the lock collar 140 can include two or more circumferentially offset portions that can be configured to be coupled together or hinged together, and the two or more portions can be moved laterally toward the lifting piston 120 and then closed around the lifting piston 120. In the example shown in FIG. 6, the lock collar 140 can be positioned above and in contact with the load distribution plate 150. Thus, the lock collar 140 can be spaced apart from the body 110. In another example, where the load distribution plate 150 is omitted, the lock collar 140 can be positioned above and in contact with the body 110.

Figure 7:
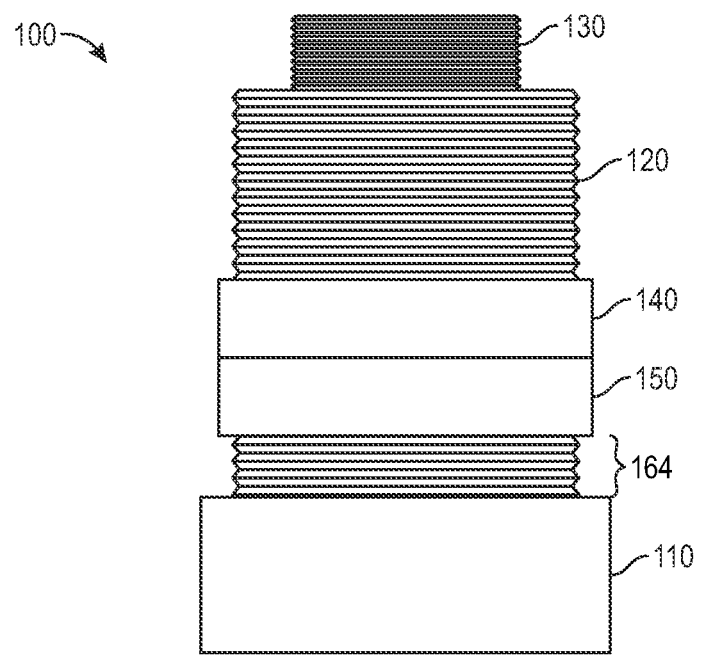
FIG. 7 illustrates a side view of the jack assembly with the lifting piston, the lock collar, and the load distribution plate raised (e.g., to a second height) such that the load distribution plate is spaced apart from the body, according to an example.

The method 500 can also include moving the lock collar 140 and/or the load distribution plate 150 upward with respect to the body 110 and/or the lifting piston 120, as at 508. This is shown in FIG. 7. This moves the top of the jack assembly 100 (e.g., the extension screw 130) from a first height to a second height. This can include rotating the lock collar 140 to move the lock collar 140 upward with respect to the body 110 and/or the lifting piston 120 (e.g., due to the threaded engagement between the lifting piston 120 and the lock collar 140). In one example, a threaded engagement can also be present between the lifting piston 120 and the load distribution plate 150, and the load distribution plate 150 can be moved upward by rotating the load distribution plate 150 with respect to the lifting piston 120. In another example, a threaded engagement may not be present between the lifting piston 120 and the load distribution plate 150, and the load distribution plate 150 can be moved upward by exerting a manual or automatic force on the load distribution plate 150 (e.g., without rotating the load distribution plate 150). For example, the lock collar 140 and/or load distribution plate 150 can be lifted using the housing 170. After the upward movement, a gap 164 can be present between the body 110 and the load distribution plate 150 and/or between the body 110 and the lock collar 140 (when the load distribution plate 150 is omitted).

Figure 8:
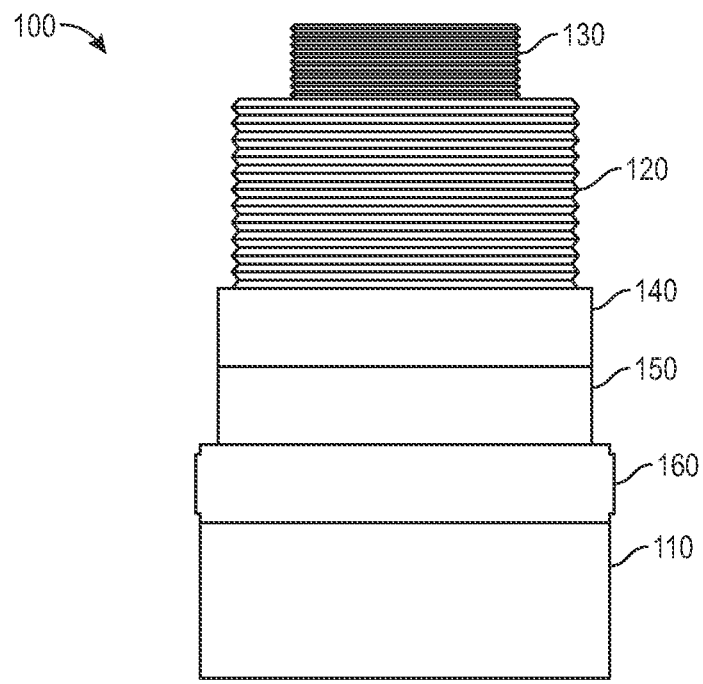
FIG. 8 illustrates a side view of the jack assembly with a load cell positioned in the gap between the load distribution plate and the body, according to an example.

The method 500 can also include positioning the load cell 160 at least partially around the lifting piston 120, as at 510. This is shown in FIG. 8. The load cell 160 can be positioned at least partially within the gap 164 between the body 110 and the load distribution plate 150 and/or between the body 110 and the lock collar 140 (when the load distribution plate 150 is omitted). In one example, the load cell 160 can be substantially U-shaped and moved laterally toward the lifting piston 120. In another example, the load cell 160 can be a single annular cell that can be positioned proximate to the top of the lifting piston 120 and then moved downward with respect to the lifting piston 120 (e.g., before steps 504 and/or 506). In yet another example, the load cell 160 can include two or more circumferentially offset portions that can be configured to be coupled together or hinged together, and the two or more portions can be moved laterally toward the lifting piston 120 and then closed around the lifting piston 120. Although not shown, in one example, the jack assembly 100 can already be supporting the object 180 at the time that the load cell 160 is positioned at least partially around the lifting piston 120. A vertical gap is present between the lock collar 140 and the load cell 160 when the load cell 160 is moved into position at least partially around the lifting piston 120, and the load cell 160 is not able to measure the downward force when the vertical gap is present.

Figure 9:
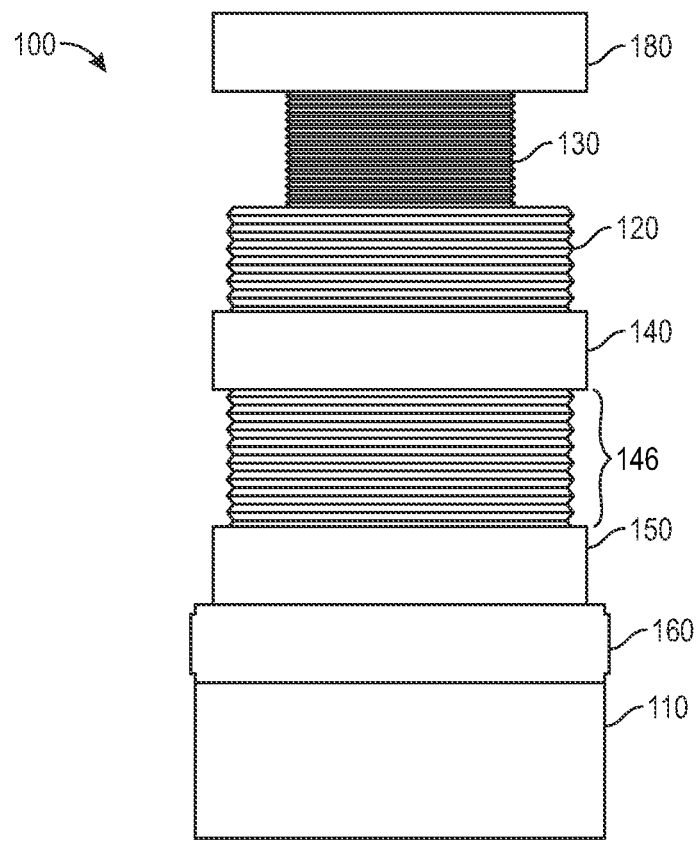
FIG. 9 illustrates a side view of the jack assembly with the lifting piston and the lock collar raised (e.g., to a third height) to contact and support a load of an object (e.g., an aircraft), according to an example.

The method 500 can also include moving the lifting piston 120 and/or the lock collar 140 upward with respect to the body 110, as at 512. This is shown in FIG. 9. This moves the top of the jack assembly 100 (e.g., the extension screw 130) from the second height to a third height that is greater than the second height. In one example, the lifting piston 120 can be (e.g., hydraulically) moved upward until the lifting piston 120 and/or the extension screw 130 contact and/or lift the object 180. In another example, the lifting piston 120 and/or the extension screw 130 can be placed in contact with the object 180 during an earlier step (e.g., step 508), and step 512 can be used to lift the object 180. As shown in FIG. 9, the load distribution plate 150 and/or the load cell 160 may not move upward together with the lifting piston 120 and/or the lock collar 140. This can result in a gap 146 between the lock collar 140 and the load distribution plate 150 or between the lock collar 140 and the load cell 160 (when the load distribution plate 150 is omitted). The lifting piston 120 and the lock collar 140 are configured to move vertically while the body 110 and the load cell 160 remain vertically stationary.

Figure 10:
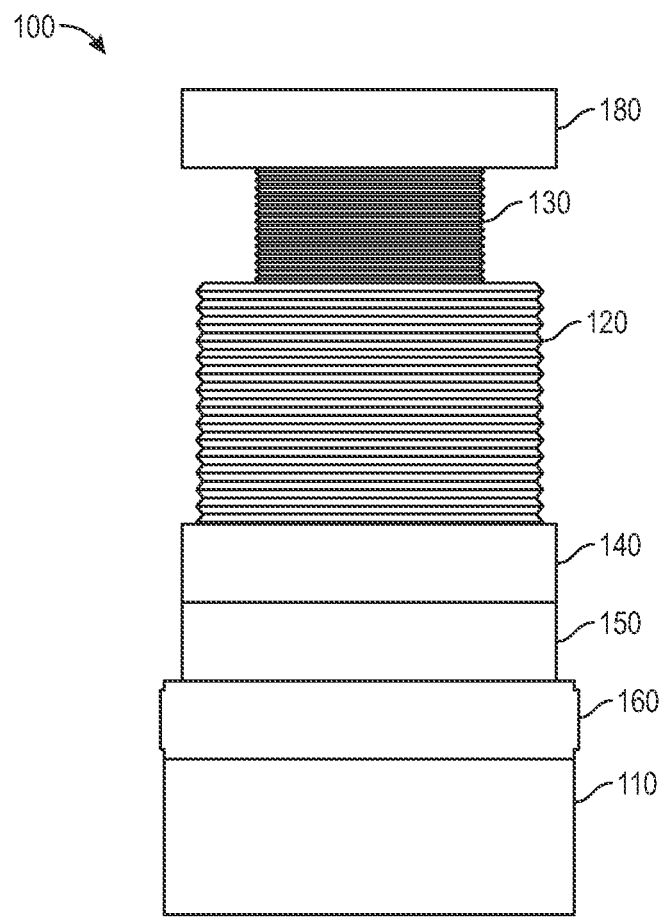
FIG. 10 illustrates a side view of the jack assembly with the lock collar lowered into contact with the load distribution plate such that the load cell can measure the load of the object, according to an example.

The method 500 can also include moving the lock collar 140 downward with respect to the body 110 and/or the lifting piston 120, as at 514. This is shown in FIG. 10. This can include rotating the lock collar 140 with respect to the lifting piston 120 until the lower surface of the lock collar 140 contacts the upper surface of the load distribution plate 150, or contacts the upper surface of the load cell 160 (when the load distribution plate 150 is omitted). At this point, the hydraulic pressure/force supplied to the lifting piston 120 can be removed, and the object 180 can be mechanically supported by the jack assembly 100. More particularly, the downward force of the object 180 can be transmitted from the object 180 to the extension screw 130 to the lifting piston 120, to the lock collar 140 to the load distribution plate 150 to the load cell 160 to the body 110.

The method 500 can also include measuring a load of the object 180 using the load cell 160, as at 516. The load can be or include the weight and/or downward force exerted by the object 180 onto the jack assembly 100.

The method 500 can also include removing the load cell 160 from the lifting piston 120, as at 518. In one example, the load cell 160 can be removed while the jack assembly 100 continues to lift and/or support the object 180. Removing the load cell 160 can include moving the lifting piston 120, the lock collar 140, the load distribution plate 150, and/or the object 180 upward with respect to the body 110 (e.g., hydraulically or by lifting/supporting/actuating a separate or integral load cell housing 170), and then moving the load cell 160 laterally away from the lifting piston 120 while the aforementioned components are held in their lifted state(s).

In one implementation, a second (e.g., replacement) load cell can then be positioned at least partially around the lifting piston 120. More particularly, the second load cell can be moved laterally toward the lifting piston 120 to replace the first load cell 160. The second load cell can be located in the same position that the first load cell 160 was positioned before the first load cell 160 was removed.

Figure 11:
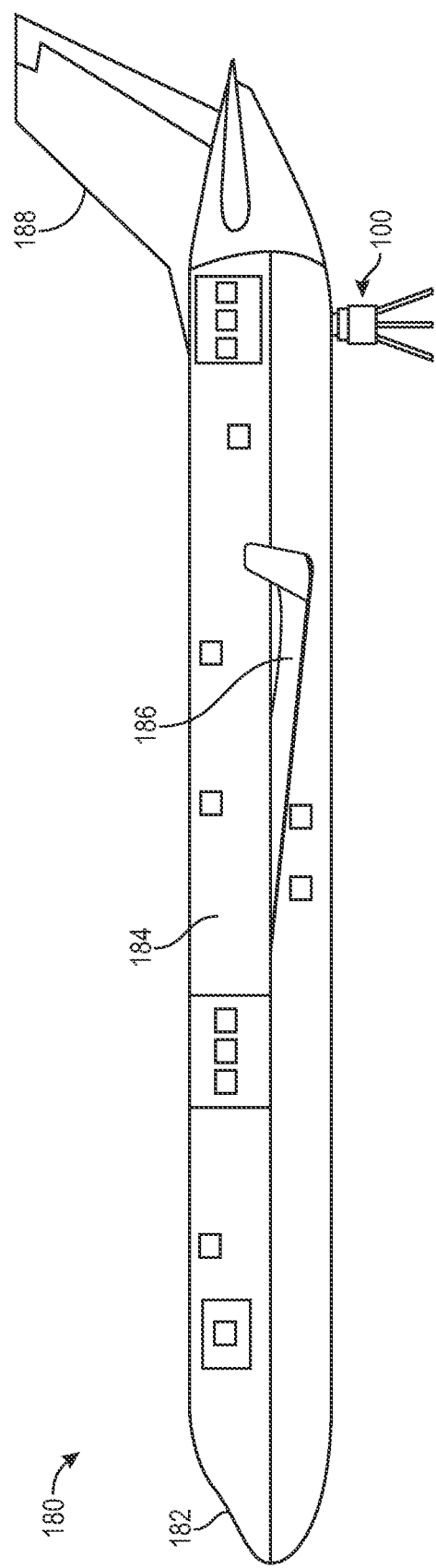
FIG. 11 illustrates a side view of the jack assembly supporting and/or lifting at least a portion of an aircraft, according to an example.

FIG. 11 illustrates a side view of the jack assembly 100 supporting at least a portion of the object 180, according to an example. As shown, the object 180 can be or include a vehicle. The vehicle can be or include an aircraft such as an airplane, a helicopter, an unmanned aerial vehicle (e.g., a drone), or the like. In the example shown, the jack assembly 100 can be used to support, stabilize, and/or lift at least a portion of the aircraft (e.g., during loading, unloading, fueling, maintenance, or the like). For example, the jack assembly 100 can be used to support the nose 182, the fuselage 184, the wings 186, and/or the tail 188.

Further, the disclosure comprises examples according to the following clauses:

Clause 1. A jack assembly, comprising: a body; a lifting piston positioned at least partially above the body and configured to move up and down with respect to the body; a lock collar positioned at least partially around the lifting piston, wherein the lock collar is configured to move up and down with respect to the lifting piston in response to rotating the lock collar with respect to the lifting piston; and a load cell positioned at least partially around the lifting piston and between the body and the lock collar, wherein the jack assembly is configured to support an object, which exerts a downward force onto the lifting piston, and wherein the downward force is transferred from the lifting piston to the lock collar to the load cell to the body, and wherein the load cell measures the downward force.

Clause 2. The jack assembly of Clause 1, wherein the lifting piston and the lock collar are configured to move vertically while the body and the load cell remain vertically stationary.

Clause 3. The jack assembly of Clause 1 or 2, wherein the load cell is substantially U-shaped and includes a circumferential gap.

Clause 4. The jack assembly of any of Clauses 1-3, wherein the load cell is configured to be moved into position at least partially around the lifting piston while the jack assembly supports the object.

Clause 5. The jack assembly of any of Clauses 1-4, wherein a vertical gap is present between the lock collar and the load cell when the load cell is moved into position at least partially around the lifting piston, and wherein the load cell is not able to measure the downward force when the vertical gap is present.

Clause 6. The jack assembly of Clause 5, wherein the lock collar is configured to move down into contact with the load cell after the load cell is moved into position, and wherein the load cell is configured to measure the downward force when the lock collar is in contact with the load cell.

Clause 7. The jack assembly of any of Clauses 1-6, wherein the load cell is configured to be removed from the lifting piston while the jack assembly supports the object.

Clause 8. The jack assembly of any of Clauses 1-7, wherein the load cell does not comprise inner threads that engage with the outer threads of the lifting piston.

Clause 9. The jack assembly of any of Clauses 1-8, further comprising a load distribution plate positioned at least partially around the lifting piston and between the lock collar and the load cell.

Clause 10. The jack assembly of Clause 9, wherein the load distribution plate does not comprise inner threads that engage with the outer threads of the lifting piston.

Clause 11. A jack assembly configured to support an object, the jack assembly comprising: a body comprising: a central cylinder defining a vertical bore therein; and a plurality of legs that are circumferentially offset around the central cylinder; a lifting piston positioned at least partially in the vertical bore of the central cylinder, wherein the lifting piston defines a vertical bore therein, and wherein the lifting piston is configured to hydraulically move up and down with respect to the body; an extension screw positioned at least partially in the vertical bore of the lifting piston, wherein the extension screw comprises outer threads that are engaged with inner threads of the lifting piston, and wherein the extension screw is configured to mechanically move up and down with respect to the lifting piston in response to rotating the extension screw with respect to the lifting piston; a lock collar positioned at least partially around the lifting piston, wherein the lock collar comprises inner threads that are engaged with outer threads of the lifting piston, and wherein the lock collar is configured to mechanically move up and down with respect to the lifting piston in response to rotating the lock collar with respect to the lifting piston; a load distribution plate positioned at least partially around the lifting piston and between the body and the lock collar, wherein the load distribution plate comprises a single annular plate or two or more plate portions that are configured to be coupled together; and a load cell positioned at least partially around the lifting piston and between the body and the load distribution plate, wherein the load cell comprises a single annular cell, a single substantially U-shaped cell, or two or more cell portions that are configured to be coupled or hinged together; wherein, in response to the object exerting a downward force onto the lifting piston, the extension screw, or both, the downward force is transferred from the lifting piston to the lock collar to the load distribution plate to the load cell to the body, and wherein the load cell measures the downward force.

Clause 12. The jack assembly of Clause 11, wherein the load cell is substantially U-shaped and includes a circumferential gap, and wherein the load cell is configured to be positioned at least partially around the lifting piston while the lock collar and the load distribution plate are positioned at least partially around the lifting piston.

Clause 13. The jack assembly of Clause 11 or 12, further comprising a housing positioned at least partially between the body and the load distribution plate, wherein the housing comprises: a first plate; a second plate positioned below the first plate; and a lifting device configured to lift the first plate with respect to the second plate, which lifts the load distribution plate and thereby creates a vertical gap between the body and the load distribution plate, and wherein the load cell is configured to be introduced into the vertical gap, removed from the vertical gap, or both.

Clause 14. The jack assembly of any of Clauses 11-13, wherein the load cell is configured to be positioned at least partially around the lifting piston while the jack assembly supports the object.

Clause 15. The jack assembly of any of Clauses 11-14, wherein the load cell is configured to be removed from the lifting piston while the jack assembly supports the object.

Clause 16. A method for measuring a downward force exerted by an object on a jack assembly, the method comprising: positioning a lock collar at least partially around a lifting piston; raising the lifting piston and the lock collar such that a first gap is formed between the lock collar and a body; and positioning a load cell at least partially around the lifting piston, wherein the load cell is positioned in the first gap between the lock collar and the body.

Clause 17. The method of Clause 16, further comprising positioning a load distribution plate at least partially around a lifting piston, wherein the load distribution plate is positioned above the body and below the lock collar, wherein a second gap is present between the load distribution plate and the load cell when the load cell is positioned at least partially around the lifting piston, and wherein the load cell is not able measure the downward force of the object when the second gap is present.

Clause 18. The method of Clause 17, further comprising lowering the lifting piston, the lock collar, and the load distribution plate after the load cell is positioned at least partially around the lifting piston until the load distribution plate is in contact with the load cell.

Clause 19. The method of Clause 18, further comprising: supporting the object with the lifting piston such that the object exerts the downward force on the lifting piston, wherein the downward force is transferred from the lifting piston to the lock collar to the load distribution plate to the load cell; and measuring the downward force using the load cell.

Clause 20. The method of Clause 19, further comprising removing the load cell from the lifting piston while continuing to support the object.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A jack assembly, comprising:
a body;
a lifting piston positioned at least partially above the body and configured to move up and down with respect to the body;
a lock collar positioned at least partially around the lifting piston, wherein the lifting piston and the lock collar are configured to move up such that a first gap is formed between the lock collar and the body;
a load cell positioned at least partially around the lifting piston and between the body and the lock collar, wherein the load cell is positioned in the first gap between the lock collar and the body; and
a load distribution plate positioned at least partially around the lifting piston, wherein the load distribution plate is positioned above the body and below the lock collar, wherein a second gap is present between the load distribution plate and the load cell when the load cell is positioned at least partially around the lifting piston,
wherein the jack assembly is configured to support an object, which exerts a downward force onto the lifting piston, and wherein the downward force is transferred from the lifting piston to the lock collar to the load cell to the body, wherein the load cell measures the downward force, and wherein the load cell is not able measure the downward force of the object when the second gap is present.

2. The jack assembly of claim 1, wherein the lifting piston and the lock collar are configured to move vertically while the body and the load cell remain vertically stationary.

3. The jack assembly of claim 1, wherein the load cell is substantially U-shaped and includes a circumferential gap.

4. The jack assembly of claim 1, wherein the load cell is configured to be moved into position at least partially around the lifting piston while the jack assembly supports the object.

5. The jack assembly of claim 1, wherein a vertical gap is present between the lock collar and the load cell when the load cell is moved into position at least partially around the lifting piston, and wherein the load cell is not able to measure the downward force when the vertical gap is present.

6. The jack assembly of claim 5, wherein the lock collar is configured to move down into contact with the load cell after the load cell is moved into position, and wherein the load cell is configured to measure the downward force when the lock collar is in contact with the load cell.

7. The jack assembly of claim 1, wherein the load cell is configured to be removed from the lifting piston while the jack assembly supports the object.

8. The jack assembly of claim 1, wherein the load cell does not comprise inner threads that engage with the outer threads of the lifting piston.

9. The jack assembly of claim 1, wherein the load distribution plate does not comprise inner threads that engage with the outer threads of the lifting piston.

10. A jack assembly configured to support an object, the jack assembly comprising:
- a body comprising:
  - a central cylinder defining a vertical bore therein; and
  - a plurality of legs that are circumferentially offset around the central cylinder;
- a lifting piston positioned at least partially in the vertical bore of the central cylinder, wherein the lifting piston defines a vertical bore therein, and wherein the lifting piston is configured to hydraulically move up and down with respect to the body;
- an extension screw positioned at least partially in the vertical bore of the lifting piston, wherein the extension screw comprises outer threads that are engaged with inner threads of the lifting piston, and wherein the extension screw is configured to mechanically move up and down with respect to the lifting piston in response to rotating the extension screw with respect to the lifting piston;
- a lock collar positioned at least partially around the lifting piston, wherein the lock collar comprises inner threads that are engaged with outer threads of the lifting piston, and wherein the lock collar is configured to mechanically move up and down with respect to the lifting piston in response to rotating the lock collar with respect to the lifting piston;
- a load distribution plate positioned at least partially around the lifting piston and between the body and the lock collar, wherein the load distribution plate comprises a single annular plate or two or more plate portions that are configured to be coupled together; and
- a load cell positioned at least partially around the lifting piston and between the body and the load distribution plate, wherein the load cell comprises a single annular cell, a single substantially U-shaped cell, or two or more cell portions that are configured to be coupled or hinged together;
- wherein, in response to the object exerting a downward force onto the lifting piston, the extension screw, or both, the downward force is transferred from the lifting piston to the lock collar to the load distribution plate to the load cell to the body, and wherein the load cell measures the downward force.

11. The jack assembly of claim 10, wherein the load cell is substantially U-shaped and includes a circumferential gap, and wherein the load cell is configured to be positioned at least partially around the lifting piston while the lock collar and the load distribution plate are positioned at least partially around the lifting piston.

12. The jack assembly of claim 10, further comprising a housing positioned at least partially between the body and the load distribution plate, wherein the housing comprises:
- a first plate;
- a second plate positioned below the first plate; and
- a lifting device configured to lift the first plate with respect to the second plate, which lifts the load distribution plate and thereby creates a vertical gap between the body and the load distribution plate, and wherein the load cell is configured to be introduced into the vertical gap, removed from the vertical gap, or both.

13. The jack assembly of claim 10, wherein the load cell is configured to be positioned at least partially around the lifting piston while the jack assembly supports the object.

14. The jack assembly of claim 10, wherein the load cell is configured to be removed from the lifting piston while the jack assembly supports the object.

15. A method for measuring a downward force exerted by an object on a jack assembly, the method comprising:
- positioning a lock collar at least partially around a lifting piston;
- raising the lifting piston and the lock collar such that a first gap is formed between the lock collar and a body;
- positioning a load cell at least partially around the lifting piston, wherein the load cell is positioned in the first gap between the lock collar and the body; and
- positioning a load distribution plate at least partially around the lifting piston, wherein the load distribution plate is positioned above the body and below the lock collar, wherein a second gap is present between the load distribution plate and the load cell when the load cell is positioned at least partially around the lifting piston, and wherein the load cell is not able measure the downward force of the object when the second gap is present.

16. The method of claim 15, further comprising lowering the lifting piston, the lock collar, and the load distribution plate after the load cell is positioned at least partially around the lifting piston until the load distribution plate is in contact with the load cell.

17. The method of claim 16, further comprising:
- supporting the object with the lifting piston such that the object exerts the downward force on the lifting piston, wherein the downward force is transferred from the lifting piston to the lock collar to the load distribution plate to the load cell; and
- measuring the downward force using the load cell.

18. The method of claim 17, further comprising removing the load cell from the lifting piston while continuing to support the object.

* * * * *